No. 707,354. Patented Aug. 19, 1902.
F. M. PRATT.
PROCESS OF DEODORIZING.
(Application filed Apr. 5, 1902.)
(No Model.)
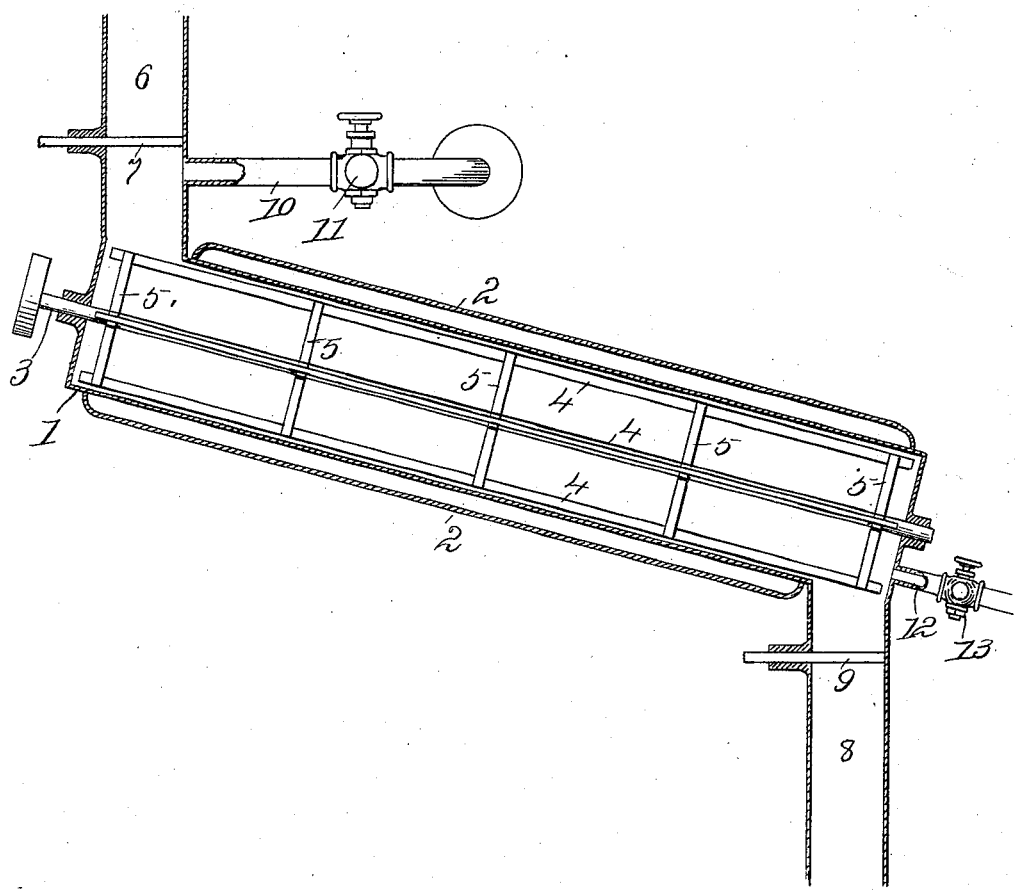
Witnesses
Ina C. Graham.
Nora Graham.
Inventor
Frank M. Pratt.
by L. P. Graham
his attorney

UNITED STATES PATENT OFFICE.

FRANK M. PRATT, OF DECATUR, ILLINOIS.

PROCESS OF DEODORIZING.

SPECIFICATION forming part of Letters Patent No. 707,354, dated August 19, 1902.

Application filed April 5, 1902. Serial No. 101,583. (No specimens.)

*To all whom it may concern:*

Be it known that I, FRANK M. PRATT, of the city of Decatur, county of Macon, and State of Illinois, have invented a certain new and useful Process of Deodorizing, of which the following is a specification.

This invention is particularly applicable to deodorizing cornmeal, cotton-seed meal, and the like, from which the oil has been extracted by the means of a hydrocarbon solvent, and it is intended to provide a process that will permit a complete removal of undesirable odors.

It is understood that live steam will remove the odor of a hydrocarbon when applied under favorable conditions, and one of such conditions is the heating of the substance to be deodorized prior to the application of the steam, while another of such conditions is the agitation of the substance during the heating and the subsequent steaming process.

It is the object of my invention to provide for heating and agitating the substance to be treated prior to the application of steam and to continue the agitation and the heating during the application of the steam. If the substance to be treated contains enough water to become moist or pasty, the action of the steam is ineffective, and if the substance becomes moistened by water of condensation during the application of the steam the result is also unsatisfactory. To get the best results, the substance to be deodorized should contain a little or no water when the steam is applied, and condensation of the steam to any considerable extent must be avoided.

To attain the desired result, I heat a chamber externally, supply the chamber with a batch of the substance to be deodorized, and stir the material in the chamber until it has become heated to an extent sufficient to preclude condensation of the subsequently-applied steam. Afterward I pass live steam through the substance to be deodorized and continue the stirring of the substance and the external application of heat to the chamber during the application of the steam. When the substance is completely deodorized, the steam is cut off from the chamber, the treated batch is removed, another is supplied, and the operation is repeated in the manner described.

In the drawing forming part of this specification an apparatus capable of performing my process is shown in longitudinal vertical section.

The treating-chamber is shown at 1, a steam-jacket incasing the heating-chamber is shown at 2, and the shaft for the stirring-reel is shown at 3. The stirring-reel may be formed in various ways; but it is preferably comprised of a set of bars 4, disposed parallel to shaft 3 and connected therewith by means of arms 5. Pipe 6 constitutes an inlet for the feed, and such inlet is closable by means of a valve, as 7. The outlet for the chamber is shown at 8, and at 9 is shown a valve for the outlet.

10 represents a pipe leading to a suction-fan or vacuum-chamber, and it constitutes a vapor-outlet. The pipe 10 is provided with a valve, as 11. A steam-inlet pipe is shown at 12, and at 13 is shown a valve by which the steam-inlet pipe may be closed. The chamber in which the deodorizing process is performed is shown inclined with relation to the horizontal, the purpose of such inclination being to facilitate the filling and unloading of the chamber. This position is desirable, but not indispensable.

In performing the operation heat is supplied to the jacket 2, and the chamber 1 is heated thereby. The substance to be treated is supplied through the inlet-pipe while the stirring-reel is turned, and the action of gravity, combined with the motion of the reel, causes the substance to pass toward the discharge end of the chamber, which is closed during the filling operation, and to eventually fill the chamber. If the material to be treated is not hot enough to prevent condensation of steam by the time the chamber is filled, the stirring operation is continued until the necessary temperature is attained. When live steam is admitted through pipe 12, valve 11 is opened, the stirring action of the reel and the application of external heat are continued, and the flow of steam through the chamber is maintained until the material therein is entirely deodorized. During the application of steam to the material in the chamber the valve of the inlet-pipe is closed to exclude the air, which would otherwise interfere with proper action of the steam. After the deodorizing operation is completed valves 13 and 11 are closed, valve 9 is opened, and the stirring action of the reel is continued until the contents of the chamber are discharged. The operation is in part continuous and in part intermittent. The reel runs continuously and enters into all of the different steps of the process, but there is intermittency in the supply of material to the chamber and in the steaming operations. Under favorable conditions the process may be made approximately continuous; but when the conditions demand prolonged steaming of the material in order to effectively remove the odor the material may be held in the chamber as long as desired.

I claim—

1. The process of deodorizing which consists in supplying a batch of the material to be treated to an externally-heated chamber, holding the material in the chamber until the temperature of the material is high enough to avoid condensation of steam, and then passing live steam through the material; the material being continuously stirred and external heat being continuously applied to the chamber during the several steps of the process.

2. The process of deodorizing which consists in supplying the material to be treated to an externally-heated chamber, stirring the material in the heated chamber, closing the chamber against admission of air and passing live steam through the material in the chamber while continuing the stirring and the application of external heat.

In testimony whereof I sign my name in the presence of two subscribing witnesses.

FRANK M. PRATT.

Witnesses:
CHAS. F. PRATT,
CLEM E. WISMAN.